US012476059B2

(12) United States Patent
Tan et al.

(10) Patent No.: US 12,476,059 B2
(45) Date of Patent: Nov. 18, 2025

(54) DIRECT-CURRENT CONTACTOR, POWER DISTRIBUTION BOX, POWER BATTERY ASSEMBLY, AND VEHICLE

(71) Applicant: Huawei Digital Power Technologies Co., Ltd., Shenzhen (CN)

(72) Inventors: Bozhi Tan, Dongguan (CN); Wenjun Wang, Dongguan (CN); Jiaan Tang, Dongguan (CN); Guangming Huang, Dongguan (CN); Taixian Chen, Dongguan (CN); Fugao Zhao, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 18/185,110

(22) Filed: Mar. 16, 2023

(65) Prior Publication Data

US 2023/0223222 A1 Jul. 13, 2023

Related U.S. Application Data

(63) Continuation of application No. PCT/CN2021/115399, filed on Aug. 30, 2021.

(30) Foreign Application Priority Data

Sep. 17, 2020 (CN) ......................... 202010981738.6

(51) Int. Cl.
*H01H 33/08* (2006.01)
*H01H 3/18* (2006.01)
(Continued)

(52) U.S. Cl.
CPC ............ *H01H 33/08* (2013.01); *H01H 33/42* (2013.01); *H01H 33/18* (2013.01)

(58) Field of Classification Search
CPC ........ H01H 33/08; H01H 33/42; H01H 33/18; H01H 9/36; H01H 9/46; H01H 9/345;
(Continued)

(56) References Cited

U.S. PATENT DOCUMENTS 3,946,282 A * 3/1976 Weiss .................. H02H 11/001 361/76
5,130,504 A 7/1992 Moldovan et al.
(Continued)

FOREIGN PATENT DOCUMENTS

CN 200941346 Y 8/2007
CN 103515153 A 1/2014
(Continued)

OTHER PUBLICATIONS

Translation of CN204632678 (Original document published Sep. 9, 2015) (Year: 2015).*

*Primary Examiner* — William A Bolton
(74) *Attorney, Agent, or Firm* — WOMBLE BOND DICKINSON (US) LLP

(57) ABSTRACT

A direct-current contactor includes a contact assembly, an arc extinguishing assembly, and a drive assembly. The arc extinguishing assembly is disposed around the contact assembly. The contact assembly includes a moving contact mechanism and a stationary contact mechanism that are disposed in pairs. The moving contact mechanism includes a moving contact. The stationary contact mechanism includes a stationary contact and an arc introducing plate disposed around the stationary contact. The arc introducing plate is configured to introduce an electric arc generated between the moving contact mechanism and the stationary contact mechanism into the arc extinguishing assembly. The
(Continued)

drive assembly is configured to drive a connection or a disconnection of the moving contact and the stationary contact.

19 Claims, 9 Drawing Sheets

(51) Int. Cl.
*H01H 33/42* (2006.01)
*H01H 33/18* (2006.01)

(58) Field of Classification Search
CPC ...... H01H 9/44; H01H 1/54; H01H 2001/545; H01H 50/546; H01H 50/38; H01H 50/34; H01H 50/54; H01H 9/362
USPC ................................ 218/146–148, 151, 105
See application file for complete search history.

(56) References Cited

U.S. PATENT DOCUMENTS 6,064,024 A * 5/2000 Moldovan .............. H01H 9/443 335/201
6,417,749 B1 7/2002 Kappel et al.
8,502,102 B2 * 8/2013 Eriksson .............. H01H 33/182 218/150
9,373,468 B2 * 6/2016 Priest ..................... H01H 33/08
11,742,166 B2 * 8/2023 Hoffmann .............. H01H 50/18 335/185
2013/0240495 A1 * 9/2013 Yano ...................... H01H 9/443 219/123
2015/0213980 A1 * 7/2015 Lee ........................ H01H 50/10 335/185
2019/0304726 A1 * 10/2019 Ishikawa .................. H01H 1/54

FOREIGN PATENT DOCUMENTS

CN 204155859 U 2/2015
CN 204632678 * 9/2015 ............ H01H 33/18
CN 204632678 U 9/2015
CN 107026056 A 8/2017
CN 208045411 U 11/2018
CN 209418334 U 9/2019
CN 110571101 A 12/2019
CN 112309775 A 2/2021

* cited by examiner

DIRECT-CURRENT CONTACTOR, POWER DISTRIBUTION BOX, POWER BATTERY ASSEMBLY, AND VEHICLE

CROSS-REFERENCE TO RELATED APPLICATIONS

This application is a continuation of International Application No. PCT/CN2021/115399, filed on Aug. 30, 2021, which claims priority to Chinese Patent Application No. 202010981738.6, filed on Sep. 17, 2020. The disclosures of the aforementioned applications are hereby incorporated by reference in their entireties.

TECHNICAL FIELD

This application relates to the contactor field, and, in particular, to a direct-current contactor, a power distribution box, a power battery assembly, and a vehicle.

BACKGROUND

A contactor is a commonly used electrical switch, and is widely applied. For example, the contactor may be used in a device such as an industrial device, an electric vehicle, or a charging pile. A working principle of the contactor is to implement connection of a circuit through controlling connection and disconnection of a stationary contact and a moving contact.

However, in connection and disconnection processes of the contactor, an electric arc is generated between the stationary contact and the moving contact when a current passes. The generated electric arc burns the stationary contact and the moving contact, thereby reducing service lives of the stationary contact and the moving contact. Contactors may be classified into direct-current contactors and alternating-current contactors. An existing direct-current contactor is usually a direct-current contactor with a sealed gas-filled arc extinguishing structure. The direct-current contactor with this structure can be used in a circuit whose operating voltage is more than 200 V DC. However, in the direct-current contactor with this structure, sealing performance needs to be strictly ensured to effectively implement arc extinguishing. Therefore, the sealed gas-filled arc extinguishing contactor has a complex structure and a complex assembling process.

SUMMARY

This application provides a direct-current contactor, a power distribution box, a power battery assembly, and a vehicle, to prolong a service life of the direct-current contactor and simplify a structure of the direct-current contactor.

In some embodiments, the present disclosure provides a direct-current contactor. The direct-current contactor includes a contact assembly, an arc extinguishing assembly, and a drive assembly. The arc extinguishing assembly is disposed around the contact assembly. The contact assembly includes a moving contact mechanism and a stationary contact mechanism that are disposed in pairs. The moving contact mechanism includes a moving contact. The stationary contact mechanism includes a stationary contact and an arc introducing plate disposed around the stationary contact. The arc introducing plate is configured to introduce an electric arc generated between the moving contact mechanism and the stationary contact mechanism into the arc extinguishing assembly. The drive assembly is configured to drive connection or disconnection of the moving contact and the stationary contact.

In the direct-current contactor in this application, the arc introducing plate is disposed around the stationary contact. However, the electric arc generated in connection and disconnection processes of the stationary contact and the moving contact is transferred from the stationary contact to the arc introducing plate. Then, the arc introducing plate introduces the electric arc into the arc extinguishing assembly to perform arc extinguishing, thereby protecting the stationary contact and effectively preventing the electric arc from burning the stationary contact and the moving contact. In this way, a service life of the direct-current contactor is prolonged. In addition, the direct-current contactor does not need to be filled with an arc extinguishing gas, and may have an open structure. Therefore, the structure of the direct-current contactor is simpler, and an assembling process of the direct-current contactor is simplified.

In some embodiments, the arc introducing plate includes an arc introducing plate body and an arc introducing pin, and the arc introducing pin extends from the arc introducing plate body in a direction away from the stationary contact and is inserted to the arc extinguishing assembly. The arc introducing pin is disposed. Therefore, it is more convenient to insert the arc introducing plate to the arc extinguishing assembly, to introduce the electric arc to a location in the arc extinguishing assembly through the arc introducing pin.

In some embodiments, the arc introducing pin gradually bends and extends from a plane on which the stationary contact is located in a direction away from the moving contact mechanism, to introduce the electric arc to the direction away from the moving contact and prolong a distance of the electric arc between the stationary contact and the moving contact.

In some embodiments, the arc extinguishing assembly includes two fastening frames that are spaced and disposed opposite to each other, the stationary contact is located between the two fastening frames, and a plurality of arc extinguishing plates spaced apart are disposed in each of the two fastening frames; and there are at least two arc introducing pins, at least one arc introducing pin is inserted to one of the fastening frames, and a remaining arc introducing pin is inserted to the other fastening frame. The two fastening frames are disposed, and the arc extinguishing plates are disposed in each fastening frame. In this way, regardless of directions of flowing through the stationary contact and the moving contact, the electric arc can be introduced into the arc extinguishing assembly for arc extinguishing.

In some embodiments, a free end of the arc introducing pin is located between an inner side surface of the fastening frame and an end arc extinguishing plate, to further increase a transfer distance of the electric arc.

In some embodiments, a reinforcing board is disposed at a location that is on the inner side surface of the fastening frame and that corresponds to the arc introducing pin, to prevent the electric arc from burning and damaging the fastening frame.

In some embodiments, the plurality of arc extinguishing plates are sequentially arranged and are arranged in a sector shape in a direction from the stationary contact mechanism to the moving contact mechanism, to further increase a transfer distance of the electric arc.

In some embodiments, the plurality of arc extinguishing plates are sequentially disposed in parallel in a direction from the stationary contact mechanism to the moving contact mechanism.

In some embodiments, the plurality of arc extinguishing plates are sequentially disposed in parallel in a direction from the stationary contact to the fastening frame; and the plurality of arc extinguishing plates are divided into two groups, and the two groups of arc extinguishing plates are separately disposed in a direction from the stationary contact mechanism to the moving contact mechanism. In this structure, the electric arc formed between the stationary contact and the moving contact may sequentially pass through the two groups of arc extinguishing plates, to further improve extinguishing effect.

In some embodiments, in a group of arc extinguishing plates disposed on a circumferential side part of the stationary contact, an end part of at least one arc extinguishing plate protrudes from the plane on which the stationary contact is located.

In some embodiments, in the group of arc extinguishing plates disposed on the circumferential side part of the stationary contact, the plurality of arc extinguishing plates in the group are arranged in a step shape in the direction from the stationary contact to the fastening frame; and in a group of arc extinguishing plates disposed on a circumferential side part of the moving contact, the plurality of arc extinguishing plates in the group are arranged in a step shape in a direction from the moving contact to the fastening frame. In this structure, at a location close to the stationary contact and the moving contact, a distance between the two groups of arc extinguishing plates is large, and the distance of the electric arc may be increased, to prevent closing of the electric arc herein. In addition, at a location away from the stationary contact and the moving contact, a distance between the two groups of arc extinguishing plates is small, so that the electric arc can be transferred between the two groups of arc extinguishing plates and arc extinguishing can be implemented under a cutting function and a cooling function of the arc extinguishing plate.

In some embodiments, a chamfer is disposed at an edge of an end face of the moving contact mechanism for disposing the moving contact. The chamfer is disposed, so that the electric arc generated at the moving contact may extend and be transferred along the chamfer in the direction away from the stationary contact.

In some embodiments, the drive assembly includes a drive mechanism and a linkage bracket. The drive mechanism includes a moving iron core, a fixed iron core, a coil disposed around the fixed iron core, an accommodation cavity configured to accommodate the moving iron core and the fixed iron core, and a reset spring disposed between the moving iron core and the fixed iron core. The linkage bracket includes a push rod and a support board. One end of the push rod is axially fastened to the moving iron core, and the other end is fixedly connected to the support board. A conductive frame is disposed on a side that is of the support board and that is away from the push rod. The conductive frame is connected to the moving contact mechanism. The push rod drives, through the support board under a function of the drive mechanism, the conductive frame to move back and forth in a direction away from or close to the stationary contact mechanism.

In some embodiments, there are four contact assemblies, and the contact assemblies are distributed and disposed on a plane parallel to the support board; and there are two conductive frames that are separately disposed. Moving contact mechanisms in two contact assemblies are correspondingly disposed at two ends of one conductive frame, and moving contact mechanisms in the other two contact assemblies are correspondingly disposed at two ends of the other conductive frame. The four contact assemblies are disposed, so that simultaneous conduction of a positive electrode and a negative electrode can be implemented in circuit control.

In some embodiments, the direct-current contactor further includes two magnetic frames with U-shaped structures. Openings of the two magnetic frames are opposite to each other and are separately disposed, and encircle the contact assembly and the arc extinguishing assembly along the four contact assemblies in a circumferential direction. An opening direction of the magnetic frame is perpendicular to a length direction of the conductive frame.

In some embodiments, in a length direction of any conductive frame, arc extinguishing magnets are symmetrically disposed on an inner side of the magnetic frame. The magnetic frame and the arc extinguishing magnet are disposed, so that the electric arc can be blown out to the arc extinguishing assembly, to further improve stability of arc extinguishing effect of the direct-current contactor.

In some embodiments, a guide rod is disposed on a side that is of the support board and that is away from the push rod. The guide rod and the push rod are disposed in a co-axis manner. The guide rod is disposed, so that stability of movement of the support board can be ensured, to prevent the support board from shaking in a moving process.

In some embodiments, an insulation component is disposed between the two conductive frames, to avoid a short circuit between the two conductive frames.

In some embodiments, the conductive frame is elastically connected to the support board, to prevent the moving contact mechanism from colliding with the stationary contact mechanism.

In some embodiments, a buffer spring is disposed between the conductive frame and the support board, a protrusion is disposed on a surface that is of the support board and that faces the conductive frame, a groove is disposed on a surface that is of the conductive frame and that faces the support board, and the buffer spring is sleeved on the protrusion and is accommodated in the groove.

In some embodiments, the direct-current contactor further includes a vertical board and a fastening board for fastening the conductive frame, the vertical board is located on two sides of the conductive frame and is fastened to the support board, the fastening board is disposed on the vertical board, and the conductive frame abuts against the fastening board under a function of the buffer spring. The vertical board and the fastening board are disposed, so that assembling stability of the conductive frame can be improved.

In some embodiments, the direct-current contactor further includes a first magnetizer and a second magnetizer that are separately disposed in a direction perpendicular to the support board. The first magnetizer has a U-shaped structure whose opening direction faces a side away from the support board. The first magnetizer is located between two vertical boards located on two sides of the conductive frame. The conductive frame is fixedly connected to the first magnetizer. The second magnetizer is fastened to the side away from the support board and is disposed opposite to an opening of the first magnetizer. The first magnetizer and the second magnetizer are disposed. On the basis of gravitational force between the first magnetizer and the second magnetizer when the conductive frame is in a power-on state, bonding force between the moving contact and the stationary contact can be further improved, so that the moving contact is in close contact with the stationary contact, thereby improving connection reliability of the direct-current contactor.

In some embodiments, the direct-current contactor further includes an assembling frame body. The assembling frame body encloses the contact assembly and the arc extinguishing assembly. The stationary contact mechanism is fastened to the assembling frame body. The assembling frame body is disposed around the contact assembly and the arc extinguishing assembly. Each fixed component (for example, components such as the stationary contact mechanism and the second magnetizer) may be fastened to the assembling frame body.

In some embodiments, the direct-current contactor further includes an insulation base. The insulation base is disposed between the drive mechanism and the support board. The push rod extends in a direction from the moving iron core to the contact assembly and is connected to the support board after passing through the insulation base. Electrical isolation between the drive mechanism and the contact assembly can be implemented by disposing the insulation base, thereby further improving electrical safety of the direct-current contactor.

In some embodiments, the fastening frame is fastened to the insulation base. In addition, the assembling frame body may also be fixedly connected to the insulation base.

In some embodiments, the fixed iron core is located between the insulation base and the moving iron core.

In some embodiments, the direct-current contactor further includes a housing. The contact assembly, the arc extinguishing assembly, and the drive assembly are all disposed in a cavity of the housing. The housing can prevent impurities from entering the direct-current contactor.

In some embodiments, the present disclosure provides a power distribution box. The power distribution box includes the direct-current contactor in the embodiments of this application. The direct-current contactor in the embodiments of this application has features of a long service life and a simple structure. On this basis, because the power distribution box includes the direct-current contactor, the power distribution box also has features of a long service life and a simple structure. The power distribution box may be, for example, a fast-charge high-voltage power distribution box or a power distribution box of a battery pack.

In some embodiments, the present disclosure provides a power battery assembly. The power battery assembly includes a battery pack and the power distribution box in the embodiments of this application. The power distribution box is electrically connected to the battery pack. The power battery assembly also has all advantages of the direct-current contactor in the embodiments of this application. Details are not described herein again.

In some embodiments, the present disclosure provides a vehicle. The vehicle includes a vehicle body and the power battery assembly disposed in the vehicle body in the embodiment of this application.

Figure 1:
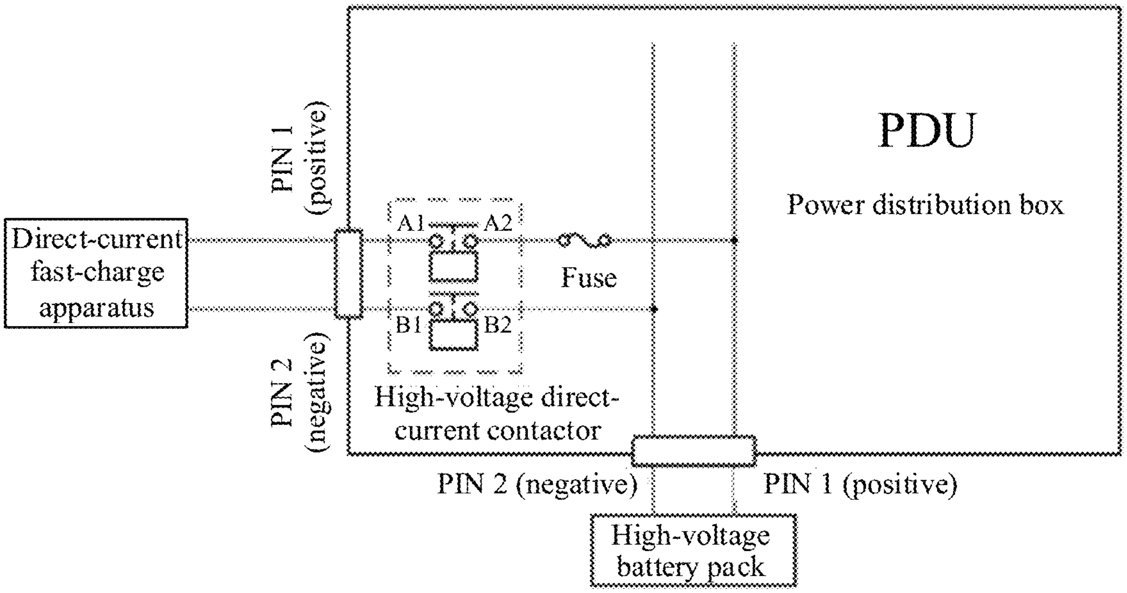
FIG. 1 is a schematic diagram of an application scenario of a direct-current contactor.

Reference numerals: 10: Housing 11: Assembling frame body 111: Frame body side board 1111: Cable trough 1112: First groove body

1113: Second groove body 1114: Fastening part 112: Frame body top board 1121: Guide hole 113: Partition board

100: Contact assembly 101: Stationary contact mechanism 1011: Stationary contact 102: Moving contact mechanism 1021: Moving contact

103: Arc introducing plate 1031: Arc introducing plate body 1032: Arc introducing pin 200: Arc extinguishing assembly 201: Fastening frame

202: Arc extinguishing plate 203: Reinforcing board **1021*a*: Chamfer 21: Magnetic frame 22: Arc extinguishing magnet 31**: Drive mechanism

311: Moving iron core 312: Fixed iron core 313: Reset spring 314: Coil 32: Linkage bracket 321: Push rod

322: Support board 323: Conductive frame 324: Guide rod 3241: Guide board 325: Buffer spring 326: Vertical board

**326*a*: Groove 327: Fastening board 328: First magnetizer 329: Second magnetizer 33: Iron yoke 34**: Magnetic pole board

35: Insulation base 36: Circuit board 37: Wiring terminal

DESCRIPTION OF EMBODIMENTS

To make objectives, technical solutions, and advantages of this application clearer, the following further describes this application in detail with reference to the accompanying drawings.

To facilitate understanding of the direct-current contactor provided in the embodiments of this application, an application scenario of the direct-current contactor is first described. The direct-current contactor may be disposed in a connection circuit of an electrical device such as an industrial device, a new energy vehicle, or a charging pile. The new energy vehicle is used as an example. A voltage of a charging circuit of the new energy vehicle is usually above 200 V DC. In this case, a high-voltage direct-current contactor becomes an important power distribution control device of a direct-current charging loop of the new energy vehicle. Currently, in a direct-current fast-charge loop, as shown in FIG. 1, according to a safety requirement (after the vehicle is charged, an isolation break point is required between a charging port or a charging gun and a live power supply), a high-voltage direct-current contactor needs to be disposed on each of lines of positive and negative electrodes on a power supply side of the charging pile or in a power distribution box (PDU) on the vehicle, to ensure safety of the charging circuit. In a charging state, a moving contact and a stationary contact in the direct-current contactor are connected, to implement conduction of the lines of the positive and negative electrodes. After the charging is completed, the moving contact and the stationary contact are disconnected, to form an isolation break point in the charging circuit, thereby ensuring electrical safety. However, in connection and disconnection processes of the direct-current contactor, an electric arc is generated between the stationary contact and the moving contact when a current passes. The generated electric arc burns the stationary contact and the moving contact, thereby reducing service lives of the stationary contact and the moving contact. An existing direct-current contactor is usually a direct-current contactor with a sealed gas-filled arc extinguishing structure. However, in the direct-current contactor with this structure, sealing performance needs to be strictly ensured to effectively implement arc extinguishing. Therefore, the sealed gas-filled arc extinguishing direct-current contactor has a complex structure and a complex assembling process. To resolve the foregoing problem, some embodiments provide a direct-current contactor. The direct-current contactor may be used to implement circuit control in a high-voltage circuit.

Terms used in the following embodiments are merely intended to describe particular embodiments, but are not intended to limit this application. As used in this specification of this application and the appended claims, singular expression forms “one”, “a”, “the”, “the foregoing”, and “this” are intended to also include an expression form such as “one or more”, unless otherwise specified in the context.

Reference to “an embodiment”, “some embodiments”, or the like described in this specification indicates that one or more embodiments of this application include a feature, structure, or characteristic described with reference to the embodiments. Therefore, statements such as “in an embodiment”, “in some embodiments”, “in some other embodiments”, and “in other embodiments” that appear at different places in this specification do not necessarily mean reference to a same embodiment, but mean “one or more but not all of embodiments”, unless otherwise emphasized in another manner. The terms “include”, “comprise”, and “have”, and variants thereof all mean “include but are not limited to”, unless otherwise emphasized in another manner.

Figure 2:
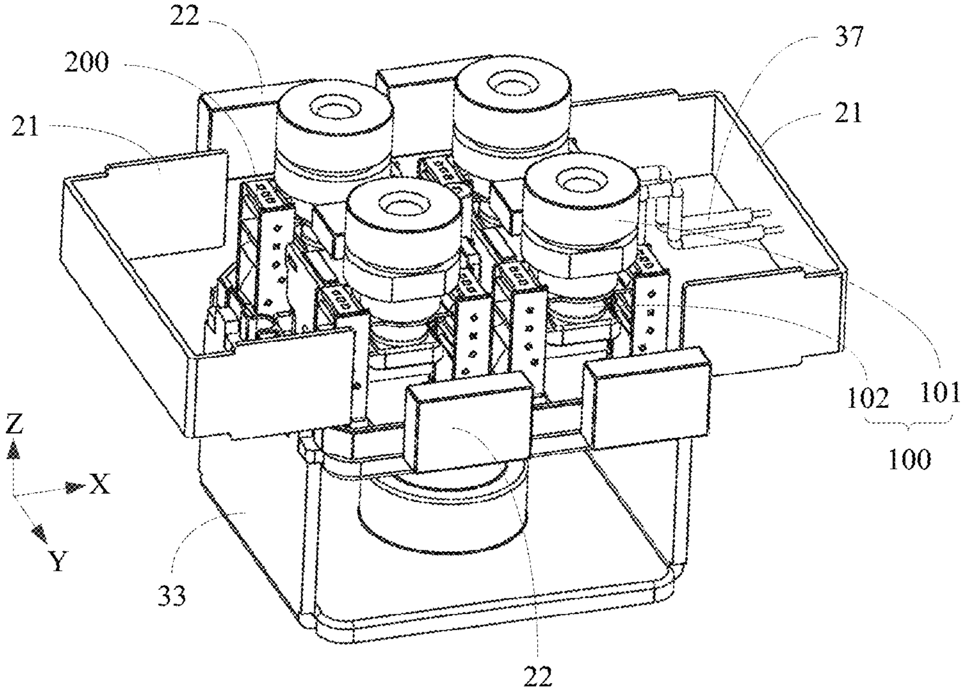
FIG. 2 is a schematic diagram of a structure of some components in a direct-current contactor according to an embodiment of this application.
Figure 3:
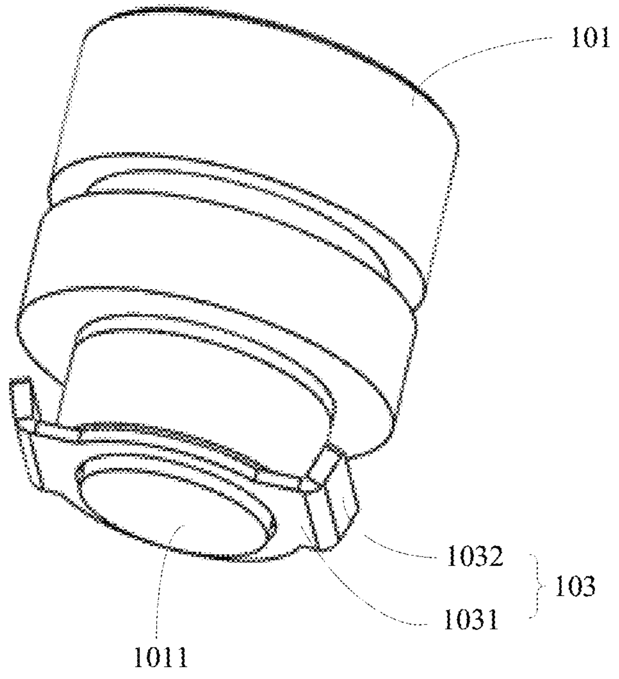
FIG. 3 is a schematic diagram of a structure of a stationary contact mechanism according to an embodiment of this application.

FIG. 2 is a schematic diagram of a structure of a direct-current contactor according to an embodiment of this application. As shown in FIG. 2, the direct-current contactor includes a contact assembly 100, an arc extinguishing assembly 200, and a drive assembly. With reference to FIG. 3 together, in some embodiments, the contact assembly 100 includes a stationary contact mechanism 101 and a moving contact mechanism 102 that are disposed in pairs in a Z direction (as shown in FIG. 2). A stationary contact 1011 is disposed at an end part of the stationary contact mechanism 101. An arc introducing plate 103 is disposed around the stationary contact 1011. The arc introducing plate 103 may include an arc introducing plate body 1031 and an arc introducing pin 1032. The arc introducing pin 1032 is formed through extending from an edge of the arc introducing plate body 1031 in a direction away from the stationary contact 1011. The arc introducing pin 1032 is inserted to the arc extinguishing assembly 200. The arc introducing plate body 1031 may be but is not limited to an annular structure, and is connected to and is in contact with the stationary contact 1011. In addition to the annular structure, the arc introducing plate body 1031 may be further disposed in a semi-arc structure or a partial sheet-like structure, provided that the arc introducing plate body 1031 is electrically connected to and is in contact with the stationary contact 1011.

Figure 4:
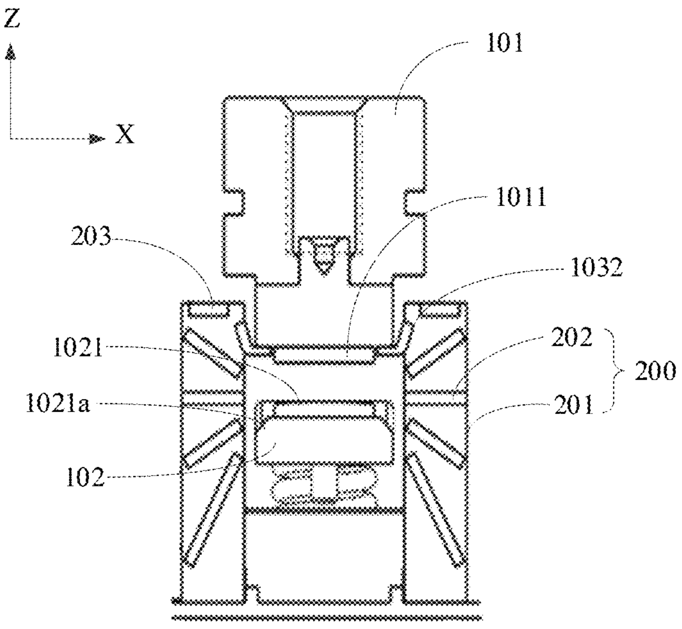
FIG. 4 is a schematic diagram of a structure indicating relative locations of a contact assembly and an arc extinguishing assembly according to an embodiment of this application.

FIG. 4 is a schematic diagram indicating a relative location relationship between a contact assembly 100 and an arc extinguishing assembly 200 according to an embodiment of this application. As shown in FIG. 4, a moving contact 1021 is disposed at an end part of the moving contact mechanism 102. The stationary contact 1011 and the moving contact 1021 are disposed opposite to each other in the Z direction.

In the direct-current contactor in this embodiment of this application, the arc introducing plate 103 including the arc introducing pin 1032 is disposed around the stationary contact 1011, so that the electric arc generated in the connection and disconnection processes of the stationary contact 1011 and the moving contact 1021 can be transferred from the stationary contact 1011 to the arc introducing plate 103 and then transferred to the arc introducing pin 1032. In this case, the arc introducing pin 1032 introduces the electric arc into the arc extinguishing assembly 200 for arc extinguishing, thereby further protecting the stationary contact 1011 and effectively preventing the electric arc from burning the stationary contact 1011 and the moving contact 1021. In this way, conduction performance of the stationary contact 1011 and the moving contact 1021 is more stable.

With reference to FIG. 4, in some embodiments, the moving contact mechanism 102 includes a moving contact mechanism base. The moving contact 1021 is disposed on an end face on a side that is of the moving contact mechanism base and that faces the stationary contact mechanism 101. A chamfer **1021*a* is disposed at an edge of the end face that is of the moving contact mechanism base and that is used to dispose the moving contact 1021. The chamfer 1021*a* may be, for example, an arc chamfer. The chamfer 1021*a* is disposed on the end face of the moving contact mechanism 102, so that the electric arc at the moving contact 1021 can extend along the chamfer 1021*a* in a direction away from the stationary contact 1011. In this case, the electric arc is transferred from the moving contact 1021 in the direction away from the stationary contact 1011**, thereby increasing a transfer path of the electric arc.

It may be understood that a circuit connection function needs to be implemented after the stationary contact mechanism 101 and the moving contact mechanism 102 are connected. Therefore, the stationary contact mechanism 101 and the moving contact mechanism 102 are both conductive materials. In an embodiment of this application, a stationary contact mechanism base and the moving contact mechanism base are both oxygen-free copper, the stationary contact 1011 and the moving contact 1021 may be both silver alloy contact points, and the arc introducing plate body 1031 and the arc introducing pin 1032 may be oxygen-free copper.

In this embodiment of this application, a location of the stationary contact mechanism 101 is fixed, and the moving contact mechanism 102 is connected to the drive assembly. The moving contact mechanism 102 can move back and forth in the Z direction under a function of the drive assembly, to implement connection to or disconnection from the stationary contact 1011.

With reference to FIG. 4, when the arc extinguishing assembly 200 is disposed, the arc extinguishing assembly 200 may be disposed around the contact assembly 100. The arc introducing pin 1032 is inserted to the arc extinguishing assembly 200, to introduce the electric arc generated in the connection and disconnection processes of the stationary contact mechanism 101 and the moving contact mechanism 102 into the arc extinguishing assembly 200.

With reference to both FIG. 2 and FIG. 4, in some embodiments, the correspondingly disposed arc extinguishing assembly 200 of each contact assembly 100 includes two fastening frames 201. The two fastening frames 201 are disposed opposite to each other. A plurality of arc extinguishing plates 202 spaced apart are disposed in each fastening frame 201. The arc introducing pin 1032 introduces the generated electric arc into the arc extinguishing assembly 200, to cut and cool the electric arc by using the arc extinguishing plate 202, to achieve arc extinguishing. In this structure, the stationary contact 1011 is constantly located between the two fastening frames 201, and the moving contact 1021 moves back and forth in a region between the two fastening frames 201 in the Z direction in a direction close to or away from the stationary contact 1011. An opening of the fastening frame 201 faces the contact assembly 100, to facilitate insertion of the arc introducing pin 1032.

Still with reference to FIG. 4, in some embodiments, there are two arc introducing pins 1032. One arc introducing pin 1032 is inserted to one of the fastening frames 201, and the other arc introducing pin 1032 is inserted to the other fastening frame 201. It may be understood that a quantity of arc introducing pins 1032 is not limited to two; and may alternatively be three, four, five, six, or the like. When the quantity of arc introducing pins 1032 is greater than two, at least one arc introducing pin 1032 is inserted to one fastening frame 201, and other arc introducing pins 1032 need to be inserted to the other fastening frame 201, to introduce the electric arc into the arc extinguishing assembly 200.

In addition to the foregoing structure, in another embodiment of this application, one fastening frame 201 may be alternatively disposed in the arc extinguishing assembly 200, and the fastening frame 201 may be continuously disposed around the contact assembly 100. In this structure, a quantity of arc introducing pins 1032 may be set to one, and the arc introducing pin 1032 extends to the fastening frame 201 to introduce the electric arc into the fastening frame 201. In this case, the quantity of arc introducing pins 1032 may alternatively be two or more, and the two or more arc introducing pins 1032 all extend to the fastening frame 201.

Still with reference to FIG. 4, in some embodiments, the arc introducing pin 1032 gradually bends and extends from a plane on which the stationary contact 1011 is located in a direction away from the moving contact mechanism 102. The arc introducing pin 1032 bends and extends in a direction away from the moving contact mechanism 102, to extend a transfer distance of the electric arc in the fastening frame 201 and prolong a space distance of the electric arc between the stationary contact 1011 and the moving contact 1021 in the Z direction, thereby effectively improving arc extinguishing effect.

As shown in FIG. 4, in some embodiments, after the arc introducing pin 1032 is inserted to the fastening frame 201, a free end of the arc introducing pin 1032 is located between an inner side surface of the fastening frame 201 and an arc extinguishing plate 202 close to the inner side surface. This structure is disposed, so that the generated electric arc may pass through more arc extinguishing plates 202, thereby effectively improving arc extinguishing effect. In addition, a reinforcing board 203 may be disposed on the inner side surface of the fastening frame 201, to prevent the electric arc from burning through a frame body of the fastening frame 201. The reinforcing board 203 may be disposed at a location that is on the inner side surface of the fastening frame 201 and that corresponds to an end part of the arc introducing pin 1032.

With reference to both FIG. 2 and FIG. 4, in some embodiments, the plurality of arc extinguishing plates 202 are sequentially arranged and are arranged in a sector shape in a direction from the stationary contact mechanism 101 to the moving contact mechanism 102, for example, the Z direction shown in FIG. 2. In this structure, the free end of the arc introducing pin 1032 may be located between the top arc extinguishing plate 202 and the frame body of the fastening frame 201. In this way, the electric arc generated between the stationary contact 1011 and the moving contact 1021 can sequentially pass through more arc extinguishing plates 202, to achieve effective arc extinguishing.

Figure 5:
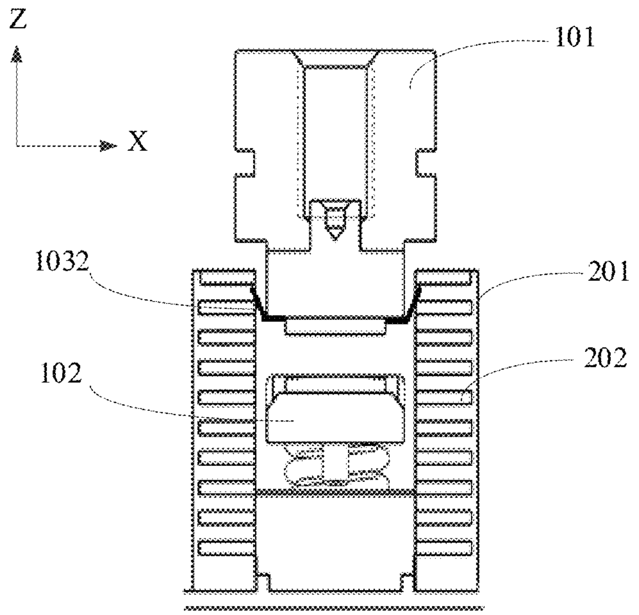
FIG. 5 is a schematic diagram of an embodiment of an arrangement structure of arc extinguishing plates according to an embodiment of this application.

As shown in FIG. 5, in another embodiment of this application, the plurality of arc extinguishing plates 202 are sequentially disposed in parallel in the direction from the stationary contact mechanism 101 to the moving contact mechanism 102, that is, the Z direction shown in FIG. 5. In the disposed structure, the arc extinguishing plate 202 is perpendicular to the Z direction. An end part of the arc introducing pin 1032 may be located between the top arc extinguishing plate 202 and the fastening frame 201.

Figure 6:
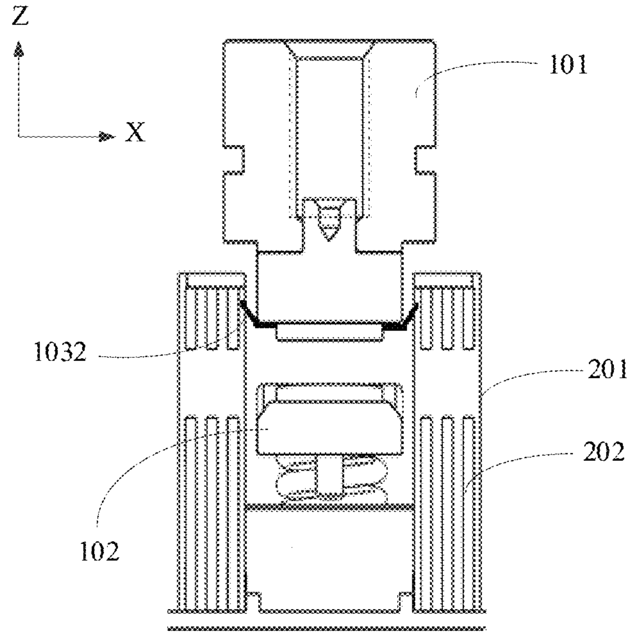
FIG. 6 is a schematic diagram of another embodiment of an arrangement structure of arc extinguishing plates according to an embodiment of this application.

As shown in FIG. 6, in another embodiment of this application, the plurality of arc extinguishing plates 202 are sequentially disposed in parallel in a direction from the stationary contact mechanism 101 to the fastening frame 201, that is, an X direction shown in FIG. 6. In the disposed structure, the arc extinguishing plate 202 is perpendicular to the X direction. When the arc extinguishing plate 202 is disposed perpendicular to the X direction, the plurality of arc extinguishing plates 202 may be disposed in two groups. One group of arc extinguishing plates 202 are disposed on a side part of the stationary contact mechanism 101, and the other group of arc extinguishing plates 202 are disposed on a side part of the moving contact mechanism 102. In the direction from the stationary contact mechanism 101 to the moving contact mechanism 102, the two groups of arc extinguishing plates 202 are separately disposed. Still with reference to FIG. 6, in an embodiment, ends of each group of arc extinguishing plates 202 are flush. In this structure, the two groups of arc extinguishing plates 202 may be disposed in an up-down correspondence manner. In addition to the disposing method in the up-down correspondence manner shown in FIG. 6, the two groups of arc extinguishing plates 202 may be alternatively disposed in an up-down staggered manner.

In some embodiments, in a group of arc extinguishing plates 202 disposed on a circumferential side part of the stationary contact 1011, an end part of any arc extinguishing plate 202 protrudes from a plane on which the stationary contact 1011 is located. This structure can effectively truncate and cool an electric arc.

Figure 7:
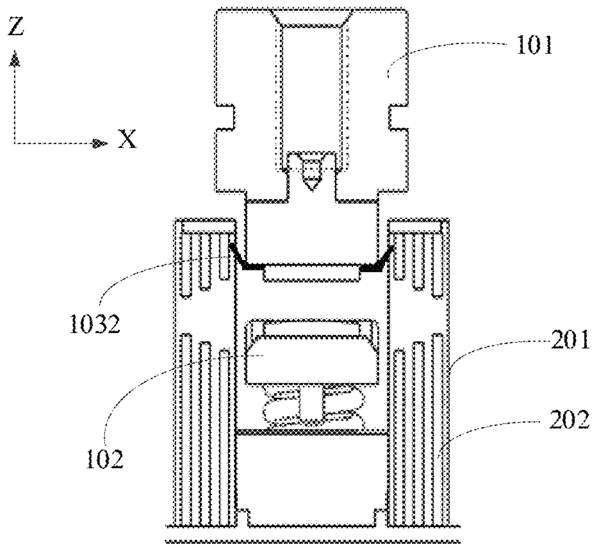
FIG. 7 is a schematic diagram of still another embodiment of an arrangement structure of arc extinguishing plates according to an embodiment of this application.

As shown in FIG. 7, in another embodiment of this application, in the group of arc extinguishing plates 202 disposed on the circumferential side part of the stationary contact 1011, the plurality of arc extinguishing plates 202 in the group are arranged in a step shape in the direction from the stationary contact 1011 to the fastening frame 201. The end part of the arc extinguishing plate 202 in the group may or may not protrude from the plane on which the stationary contact 1011 is located. In the group of arc extinguishing plates 202 on the side part of the moving contact 1021, the plurality of arc extinguishing plates 202 in the group are arranged in a step shape in the direction from the moving contact 1021 to the fastening frame 201. It may be understood that, in addition to the foregoing disposing manner of the arc extinguishing plate 202 in the fastening frame 201, a person skilled in the art may further adjust the disposing manner of the arc extinguishing plate 202 according to an application scenario. The adjustments all fall within the protection scope of this application, and are not listed one by one herein.

To implement functions of connecting and disconnecting a circuit, there are at least two contact assemblies 100 in the direct-current contactor in this embodiment of this application, to serve as connection points of two breakpoints in the same electrode conductive line. With reference to FIG. 2, in some embodiments, the direct-current contactor may include four contact assemblies 100. The four contact assemblies 100 are grouped in pairs. One group serves as a positive conduction switch, and the other group serves as a negative conduction switch. The four contact assemblies 100 may be driven by the same drive assembly, to implement simultaneous connection and disconnection of four moving contact mechanisms 102 and four stationary contact mechanisms 101 in the four contact assemblies 100.

Figure 8:
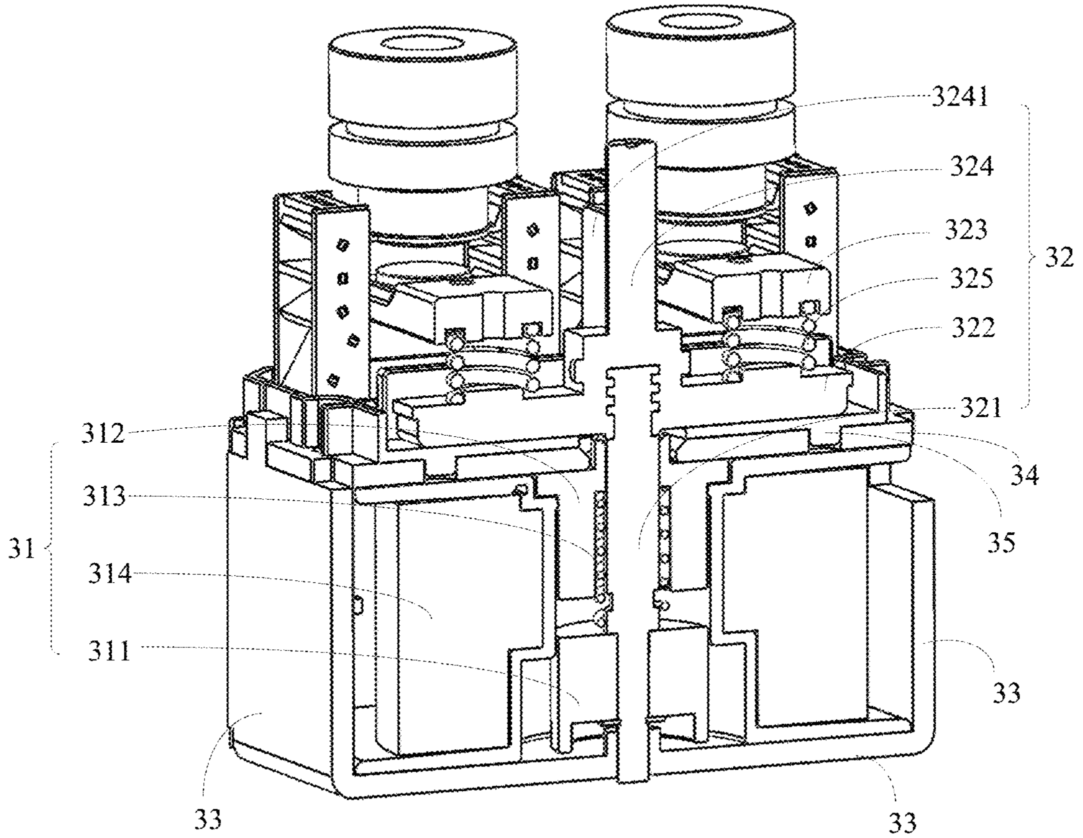
FIG. 8 is a schematic diagram of a partial cross section structure of a direct-current contactor according to an embodiment of this application.

FIG. 8 is a schematic diagram of a partial cross section structure of a direct-current contactor according to an embodiment of this application. With reference to FIG. 8, in some embodiments, the drive assembly may include a drive mechanism 31 and a linkage bracket 32. The linkage bracket 32 is fixedly connected to the drive mechanism 31. The moving contact mechanism 102 is fixedly connected to the linkage bracket 32. Therefore, the linkage bracket 32 can drive the moving contact mechanism 102 to move back and forth in the Z direction under a function of the drive mechanism 31.

Still with reference to FIG. 8, in some embodiments, the linkage bracket 32 may include a push rod 321, a support board 322, and a conductive frame 323. With reference to both FIG. 2 and FIG. 8, when there are four contact assemblies 100, two conductive frames 323 are disposed. Each conductive frame 323 is configured to conduct two of the contact assemblies 100. It may be understood that the quantity of contact assemblies 100 is merely an example for description. The quantity of contact assemblies 100 may be greater than four. The same conductive frame 323 may be simultaneously connected to two or more contact assemblies 100. When the same conductive frame 323 is simultaneously connected to more than two contact assemblies 100, each stationary contact mechanism 101 may serve as an electrical connection point. In this case, the direct-current contactor may implement simultaneous conduction of a plurality of electrical connection points of the same electrode circuit. In some embodiments, the conductive frame 323 may be a long strip structure. Two moving contact mechanisms 102 of two contact assemblies 100 are respectively fixedly connected to two ends of one conductive frame 323. Two moving contact mechanisms 102 of the other two contact assemblies 100 are respectively fixedly connected to two ends of the other conductive frame 323. The two conductive frames 323 may be disposed in parallel, and heights of the two conductive frames 323 are consistent, to facilitate simultaneous connection and disconnection of the four moving contact mechanisms 102 and the four stationary contact mechanisms 101. The moving contact mechanism 102 may be clamped to the conductive frame 323, or may be connected to the conductive frame 323 in a connection manner such as welding or riveting.

Figure 9:
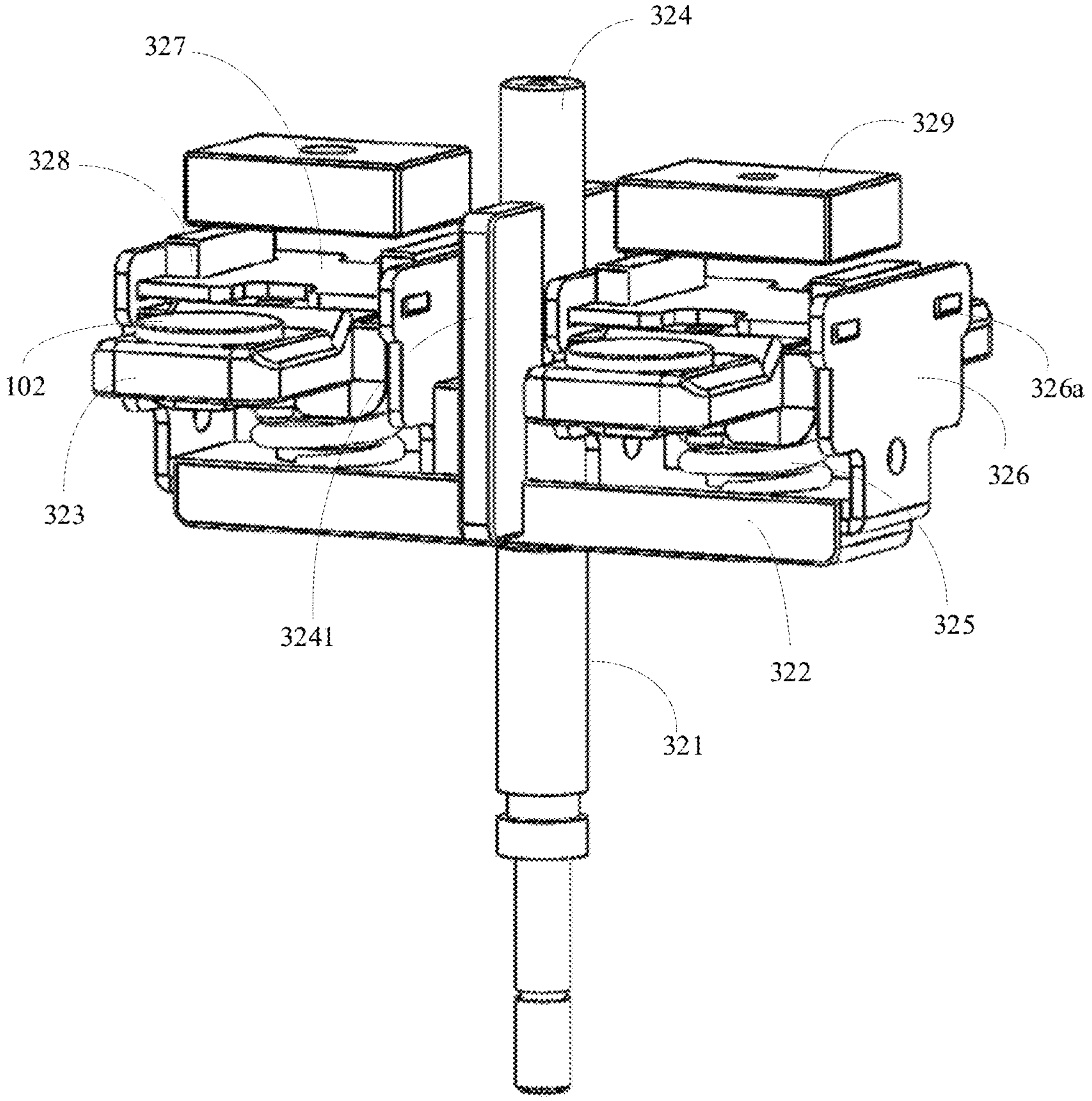
FIG. 9 is a schematic diagram of a structure of a linkage bracket according to an embodiment of this application.

FIG. 9 is a schematic diagram of a structure of a linkage bracket 32 according to an embodiment of this application. With reference to both FIG. 8 and FIG. 9, a disposing direction of the push rod 321 is consistent with a back-and-forth movement direction of the moving contact mechanism 102. With reference to FIG. 8, the push rod 321 is disposed, for example, in a Z-axis direction, and is fixedly connected to the drive mechanism 31. The support board 322 is a board-shape structure, for example, may be a rectangular board. A disposing direction of a board surface of the support board 322 is perpendicular to the Z direction, and is fixedly connected to the push rod 321. For example, as shown in FIG. 8, the push rod 321 may be threaded to the support board 322. In this case, a thread may be disposed on a side that is of the push rod 321 and that is used to connect to the support board 322, and a threaded hole is disposed on a side that is of the support board 322 and that is used to connect to the push rod 321. In this way, when the push rod 321 moves back and forth in the Z direction, the support board 322 may be driven to move back and forth in the Z direction. In addition, in this embodiment, one side of the conductive frame 323 is connected to the support board 322, and the other side is configured to connect to the moving contact mechanism 102. Therefore, when the support board 322 moves in the Z direction, the conductive frame 323 and the moving contact mechanism 102 may be driven to move in the Z direction.

In some embodiments, a guide rod 324 is further disposed on a side that is of the support board 322 and that is away from the push rod 321. The guide rod 324 is disposed in the Z direction, and is disposed with the push rod 321 in a co-axis manner. The guide rod 324 may provide a guide function for movement of the support board 322 when the push rod 321 moves. In addition, a guide board 3241 may be further disposed on a circumferential side surface of the guide rod 324. The guide board 3241 is parallel to a length direction of the conductive frame 323, and is located between the two conductive frames 323. When the push rod 321 moves, the guide function may be provided for the movement of the support board 322. In some embodiments, the support board 322, the guide rod 324, and the guide board 3241 may be an integrated structure, to reduce assembling of components. In addition, because the guide rod 324 and the guide board 3241 are disposed between the two conductive frames 323, the guide rod 324 and the guide board 3241 may both use an insulating material, to improve insulation between the two conductive frames 323.

With reference to both FIG. 8 and FIG. 9, in some embodiments, the conductive frame 323 and the support board 322 may be connected through an elastic component. For example, a buffer spring 325 may be disposed between the conductive frame 323 and the support board 322. When the moving contact mechanism 102 and the stationary contact mechanism 101 are connected, the elastic component may implement a buffer function to some extent, thereby effectively avoiding a strong impact between the moving contact mechanism 102 and the stationary contact mechanism 101.

In some embodiments, when the buffer spring 325 is disposed, an annular groove or a columnar protrusion may be disposed on a side that is of the conductive frame 323 and that faces the support board 322. One end of the buffer spring 325 is disposed in the annular groove or sleeved on the columnar protrusion. In addition, the annular groove or the columnar protrusion may also be disposed on a side that is of the support board 322 and that faces the conductive frame 323. The other end of the buffer spring 325 may be disposed in the annular groove or sleeved on the columnar protrusion, to reduce deformation of the buffer spring 325 in a direction perpendicular to a direction from the conductive frame 323 to the support board 322, thereby improving movement stability of the buffer spring 325. The buffer spring 325 may be disposed between each conductive frame 323 and the support board 322. In this case, the buffer spring 325 may be disposed in a middle part of the conductive frame 323, so that moving contact mechanisms 102 connected to two ends of the conductive frame 323 can be simultaneously connected to or disconnected from respective corresponding stationary contact mechanisms 101. In addition, a quantity of buffer springs 325 may not be limited to one. When two or more buffer springs 325 are disposed, it needs to be ensured that disposing locations between the plurality of buffer springs 325 can enable the moving contact mechanisms 102 on the conductive frame 323 to be simultaneously connected.

As shown in FIG. 9, in some embodiments, vertical boards 326 are disposed on two sides of each buffer spring 325 in a direction perpendicular to a length direction of the conductive frame 323. The vertical board 326 is perpendicular to the support board 322 and is fixedly connected to the support board 322. A groove 326*a* is disposed on the top of the vertical board 326. A fastening board 327 is disposed between the two vertical boards 326. An end part of the fastening board 327 is clamped to the groove 326*a* of the vertical board 326. The conductive frame 323 abuts against the fastening board 327 under a function of the buffer spring 325.

Still with reference to FIG. 9, in some embodiments, a first magnetizer 328 and a second magnetizer 329 are separately disposed in the Z direction at locations that are of buffer springs 325 and that correspond to the conductive frames 323. The first magnetizer 328 is located in an accommodating space formed by the vertical board 326 and the fastening board 327. The first magnetizer 328 may be a U-shaped structure. The conductive frame 323 is fixedly connected to, for example, is riveted to a bottom board of the first magnetizer 328. An opening direction of the first magnetizer 328 faces a side away from the support board 322. The buffer spring 325 is located between the first magnetizer 328 and the support board 322. In addition, the first magnetizer 328 is disposed between the two vertical boards 326. A free end of the first magnetizer 328 passes through the fastening board 327. The second magnetizer 329 is located on an opening side of the first magnetizer 328 and is fixedly disposed. In this way, when the stationary contact mechanism 101 and the moving contact mechanism 102 are in a connected and conducted state, a current passes through the conductive frame 323. In this case, a magnetic field is generated in a circumferential direction of the conductive frame 323. In the generated magnetic field, gravitational force is generated between the first magnetizer 328 and the second magnetizer 329, so that the first magnetizer 328 moves towards the second magnetizer 329. Therefore, the stationary contact mechanism 101 and the moving contact mechanism 102 are in closer contact.

It may be understood that the two conductive frames 323 may respectively correspondingly conduct a positive circuit and a negative circuit. Therefore, the conductive frame 323 needs to be made of a conductive material. For example, the conductive frame 323 may be made of an oxygen-free copper material. In addition, the two conductive frames 323 further need to be insulated from each other. Therefore, the support board 322 may be made of an insulating material, for example, may be made of a PET material.

In some embodiments, to maintain good electrical insulation between the two conductive frames 323 and between the contact assemblies 100 respectively corresponding to the two conductive frames 323, an epoxy insulation layer may be filled between the two conductive frames 323 and between the contact assemblies 100 respectively corresponding to the two conductive frames 323, thereby fully ensuring insulation between the positive circuit and the negative circuit. In another embodiment of this application, an insulation board may be disposed between the two conductive frames 323, and the insulation board and the support board 322 may be integrally disposed.

Still with reference to FIG. 8, the direct-current contactor in some embodiments further includes an insulation base 35. The insulation base 35 is located between a magnetic pole board 34 and the support board 322. Electrical isolation between the drive mechanism 31 and the contact assembly 100 and between the drive mechanism 31 and the conductive frame 323 can be implemented by disposing the insulation base 35, thereby ensuring electrical safety and preventing a short circuit. In the structure, the push rod 321 passes through the magnetic pole board 34 and the insulation base 35 to be fixedly connected to the support board 322. The insulation base 35 is made of an insulating material, and may be, for example, a PET insulation base.

In some embodiments, a mounting hole or a mounting clamp is disposed on a side that is of the insulation base 35 and that faces the support board 322, to fix a component such as the fastening frame 201 in the arc extinguishing assembly 200.

Still with reference to FIG. 8, in some embodiments, the drive mechanism 31 includes a moving iron core 311 and a fixed iron core 312 that are sequentially disposed in the Z direction, and a coil 314 disposed around the moving iron core 311 and the fixed iron core 312. A reset spring 313 is disposed between the moving iron core 311 and the fixed iron core 312. In the drive mechanism 31, after the coil 314 is powered on, the coil 314 generates a magnetic field, and gravitational force or repulsive force is generated between the moving iron core 311 and the fixed iron core 312 to drive the moving iron core 311 to move. After the coil 314 is powered off, the moving iron core 311 moves to an initial location by using the reset spring 313. In this embodiment, the moving iron core 311 is fixedly connected to the push rod 321. Therefore, when the moving iron core 311 moves, the push rod 321 may be driven to move.

In some embodiments, in a disposing direction of the push rod 321, the fixed iron core 312 is disposed on a side close to the support board 322, and the moving iron core 311 is disposed on a side away from the support board 322. After one end of the push rod 321 is fixedly connected to the support board 322, the other end passes through the fixed iron core 312 to be fixedly connected to the moving iron core 311. The reset spring 313 disposed between the fixed iron core 312 and the moving iron core 311 is sleeved on the push rod 321. To make a location of the reset spring 313 more stable, a positioning step is disposed on an inner side of the through hole that is of the fixed iron core 312 and that allows the push rod 321 to pass through, and a part of the reset spring 313 is located in the through hole and an end part of the reset spring 313 is in contact with the positioning step. In addition, the push rod 321 may also allow the moving iron core 311 to pass through, and a positioning step may also be disposed in a through hole that is of the moving iron core 311 and that allows the push rod 321 to pass through. One end that is of the reset spring 313 and that abuts against the moving iron core 311 is located in the through hole of the moving iron core 311, and abuts against the positioning step in the moving iron core 311.

As shown in FIG. 8, in some embodiments, the moving iron core 311, the fixed iron core 312, and the coil 314 are located in a U-shaped accommodation cavity formed by an iron yoke 33. Two opposite side walls and a bottom board of the U-shaped accommodation cavity are all formed by the iron yoke 33. The magnetic pole board 34 is disposed at a top opening of the U-shaped accommodation cavity, that is, at a separation location between the support board 322 and the fixed iron core 312. The fixed iron core 312 is fixedly connected to the magnetic pole board 34. The iron yoke 33 and the magnetic pole board 34 are disposed. When the coil 314 is powered on, a closed loop may be provided for a magnetic induction line generated by the coil 314.

Figure 10:
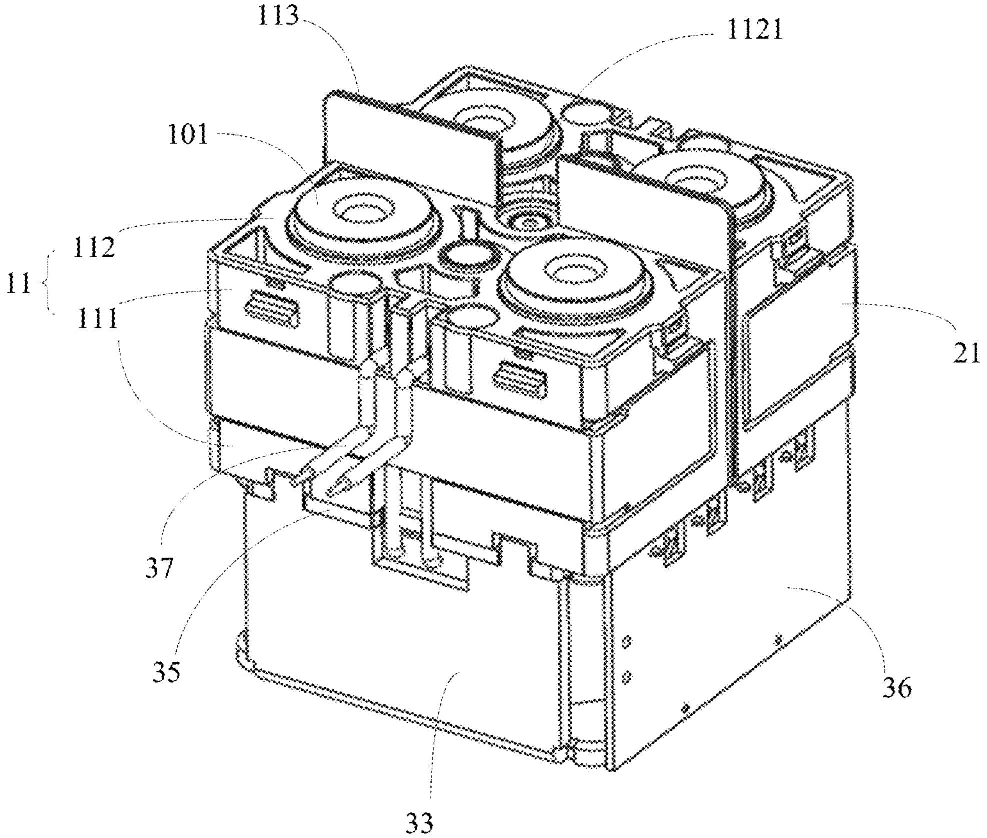
FIG. 10 is a schematic diagram of an assembling structure of a direct-current contactor according to an embodiment of this application.

FIG. 10 is a schematic diagram of an assembling structure of a direct-current contactor according to an embodiment of this application. As shown in FIG. 10, the direct-current contactor in this embodiment of this application further includes a circuit board 36 configured to supply power to the coil 314. The circuit board 36 may be disposed at a side opening of the U-shaped accommodation cavity, and seal the side opening of the U-shaped accommodation cavity. The circuit board 36 may be, for example, a printed circuit board (PCB). The circuit board 36 is electrically connected to the coil 314 and is configured to provide electricity input for the coil 314. With reference to FIG. 2, the direct-current contactor further includes a wiring terminal 37 configured to connect to an external line. The circuit board 36 is connected to the wiring terminal 37 through a lead. The wiring terminal 37 is configured to connect to an apparatus such as an external power supply.

Still with reference to FIG. 10, the direct-current contactor in some embodiments further includes an assembling frame body 11. The assembling frame body 11 includes a frame body side board 111 and a frame body top board 112. The frame body side board 111 and the frame body top board 112 may be an integrated structure. A material of this structure may be but is not limited to plastic or the like. The frame body side board 111 is disposed outside the contact assembly 100 and the arc extinguishing assembly 200 in a circumferential direction of the insulation base 35, and is fixedly connected to the insulation base 35, for example, may be clamped to the insulation base 35. The frame body top board 112 is disposed on one side of the stationary contact mechanism 101, and is perpendicular to the frame body side board 111. Components such as the contact assembly 100, the arc extinguishing assembly 200, the conductive frame 323, and the support board 322 are disposed in a space enclosed by the assembling frame body 11 and the insulation base 35. The stationary contact mechanism 101 may be fixedly connected to the frame body top board 112.

Figure 11:
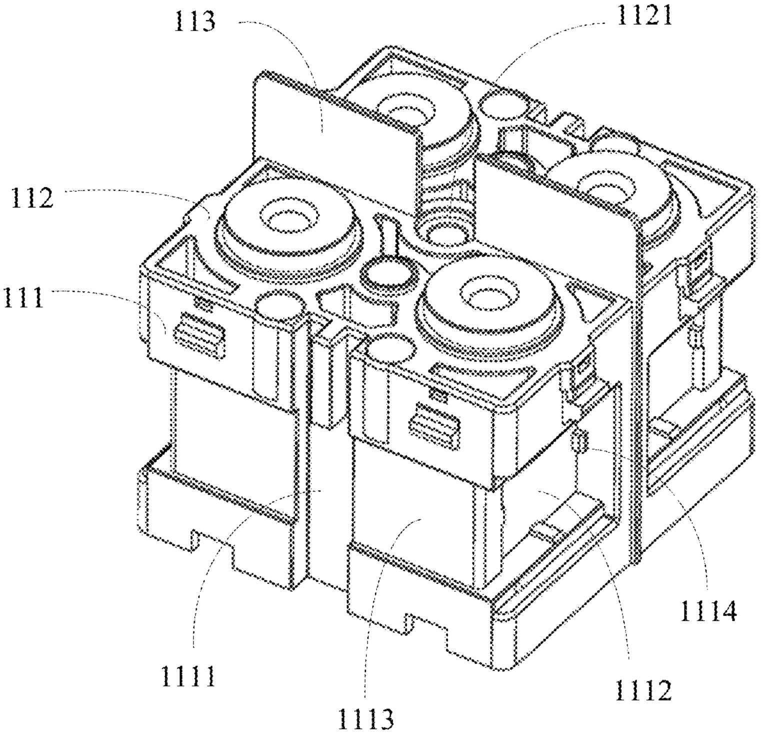
FIG. 11 is a schematic diagram of a structure of an assembling frame body according to an embodiment of this application.

FIG. 11 is a schematic diagram of a structure of an assembling frame body 11 according to an embodiment of this application. As shown in FIG. 11, a guide hole 1121 that allows the guide rod 324 to pass through is disposed on the frame body top board 112. A side wall of the guide hole 1121 may extend in a direction from a surface of the frame body top board 112 to the support board 322. In this way, the guide rod 324 may pass through the guide hole 1121. In some embodiments, the assembling frame body 11 may be further provided with a partition board 113. The partition board 113 is disposed between the two conductive frames 323, and is parallel to a length direction of the conductive frame 323. A guide groove (not shown in the figure) cooperating with the guide board 3241 is disposed on the partition board 113. When the push rod 321 moves, the guide board 3241 may move in the guide groove, so that a movement direction of the support board 322 is more stable, to avoid deflection of the support board 322 in a movement process. In addition, a clamping part configured to connect to the second magnetizer 329 is further disposed in the assembling frame body 11. Therefore, the second magnetizer 329 may be fixedly connected to the assembling frame body 11.

As shown in FIG. 11, in some embodiments, a cable trough 1111 may be disposed on the frame body side board 111, and is configured to dispose a line, to implement electrical connection between the circuit board 36 and the wiring terminal 37.

Still with reference to FIG. 2, the direct-current contactor in some embodiments further includes two magnetic frames 21 with U-shaped structures. Openings of the two magnetic frames 21 are disposed opposite to each other. The two magnetic frames 21 are separately disposed and do not in contact with each other. The openings of the two magnetic frames 21 are separately disposed. Each magnetic frame 21 surrounds two contact assemblies 100. In other words, one magnetic frame 21 surrounds two contact assemblies 100 used for positive conduction, and the other magnetic frame 21 surrounds two contact assemblies 100 used for negative conduction.

With reference to both FIG. 10 and FIG. 11, the magnetic frame 21 and an arc extinguishing magnet 22 may be fixedly disposed on the frame body side board 111 of the assembling frame body 11. For example, the frame body side board 111 may include a first groove body 1112 and a second groove body 1113. The first groove body 1112 is configured to dispose the arc extinguishing magnet 22. The second groove body 1113 may be configured to dispose the magnetic frame 21. In addition, corresponding fastening parts 1114 may be disposed in the first groove body 1112 and the second groove body 1113, to fix the magnetic frame 21 and the arc extinguishing magnet 22. The fastening part 1114 may be a clamp or the like. It may be understood that the fastening part 1114 shown in FIG. 11 is merely an example for description. In addition to a clamping part, the fastening part 1114 may be alternatively a threaded connector or the like.

Figure 12:
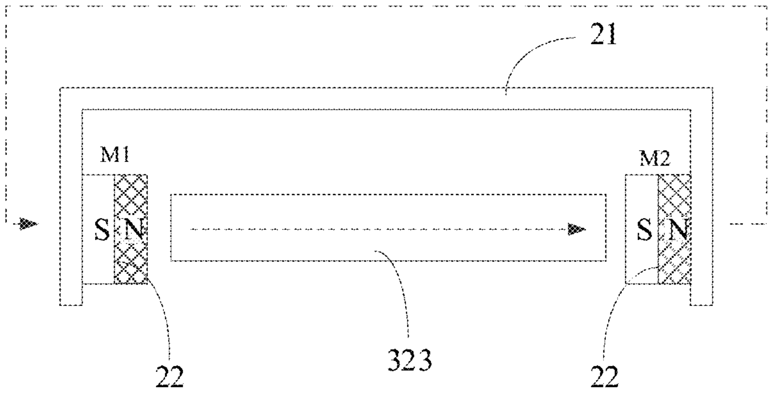
FIG. 12 is a schematic diagram of a structure indicating a relative location relationship between a magnetic frame and an arc extinguishing magnet according to an embodiment of this application.

FIG. 12 is a schematic diagram of a structure indicating relative locations of a magnetic frame 21 and a conductive frame 323. With reference to both FIG. 2 and FIG. 12, the two conductive frames 323 are respectively located at the openings of the two magnetic frames 21, and the length direction of the conductive frame 323 is perpendicular to an opening direction of the magnetic frame 21. The arc extinguishing magnet 22 is separately disposed on an inner wall of the magnetic frame 21 at a corresponding location of an end part of the conductive frame 323 in the length direction of the conductive frame 323. In each magnetic frame 21, poles of one arc extinguishing magnet 22 and poles of the other arc extinguishing magnet 22 are disposed in the same direction. For example, as shown in FIG. 12, in the length direction of the conductive frame 323, poles of the two arc extinguishing magnets 22 may be both from an S pole to an N pole, or may be both from an N pole to an S pole in a direction from one end to the other end of the conductive frame 323. For example, from the S pole to the N pole, a magnetic induction line of one arc extinguishing magnet M1 is transferred from the N pole to the S pole of the other arc extinguishing magnet M2 in the length direction of the conductive frame 323, and a magnetic induction line of the arc extinguishing magnet M2 is transferred from the N pole to the S pole of the arc extinguishing magnet M1 along the magnetic frame 21. Therefore, a closed loop is formed by using a magnetic induction line between the two arc extinguishing magnets 22 and the magnetic frame 21. When the electric arc is generated between the stationary contact 1011 and the moving contact 1021, the electric arc is blown out to one fastening frame 201 of the arc extinguishing assembly 200 under a function of the magnetic induction line in the closed loop, to prolong an arc line of the electric arc, thereby further improving arc extinguishing effect. In this embodiment, the length direction of the conductive frame 323 is perpendicular to a disposing direction: X direction of the two fastening frames 201, so that the electric arc enters the fastening frames 201 under a function of magnetic force, thereby implementing arc extinguishing through magnetic blowout.

The arc extinguishing is performed by using the arc introducing pin 1032 and the arc extinguishing plate 202 in a magnetic blowout manner, so that the direct-current contactor can implement effective arc extinguishing in an unsealed state. In this case, the direct-current contactor has a strong breaking capability and long electrical endurance. In addition, use of an arc extinguishing gas can be reduced, a sealing setting of the direct-current contactor is simplified, and the manufacturing costs of the direct-current contactor are reduced. In addition, in the direct-current contactor, the magnetic frame 21 and the arc extinguishing magnet 22 are disposed. Regardless of whether the stationary contact mechanism 101 is connected to a positive electrode or a negative electrode, the electric arc can be blown out to the arc extinguishing assembly 200, to implement non-polar arc extinguishing and reduce directivity in a use process of the direct-current contactor.

Figure 13:
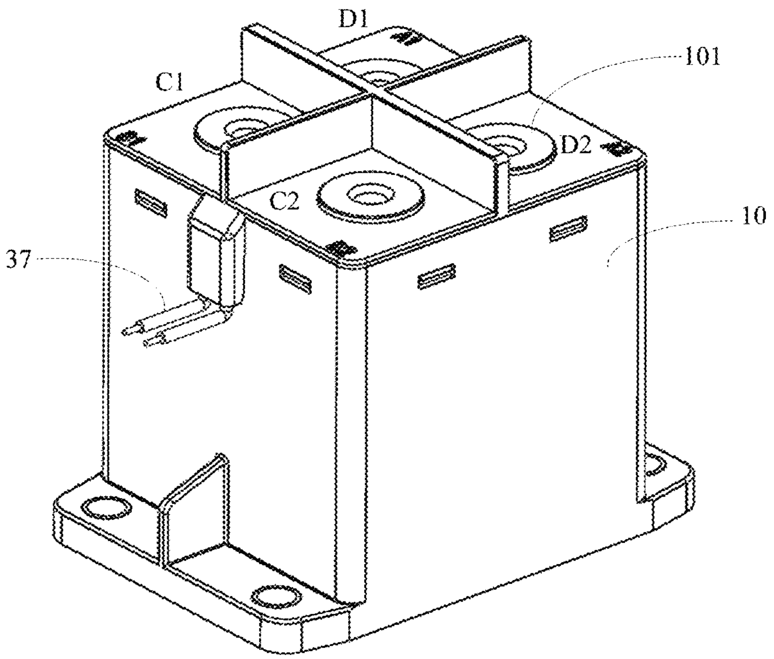
FIG. 13 is a schematic diagram of an appearance structure of a direct-current contactor according to an embodiment of this application.

FIG. 13 is a schematic diagram of an appearance structure of a direct-current contactor according to an embodiment of this application. As shown in FIG. 13, the direct-current contactor further includes a housing 10. The contact assembly 100, the arc extinguishing assembly 200, the magnetic frame 21, the arc extinguishing magnet 22, the drive mechanism 31, the linkage bracket 32, the assembling frame body 11, and the like are all disposed in the housing 10. The stationary contact mechanism 101 in the contact assembly 100 may protrude from the housing 10 and is configured to connect to an external circuit. The wiring terminal 37 is led out from the assembling frame body 11 to the outside of the housing 10, and is configured to connect to an external power supply line to provide an input current for the coil 314. When the direct-current contactor serves as a circuit control switch, two stationary contact mechanisms 101 may serve as positive connection points, and the other two stationary contact mechanisms 101 may serve as negative connection points.

The following briefly describes a working principle of the direct-current contactor in the embodiments of this application with reference to FIG. 2, FIG. 8, and FIG. 13. For ease of understanding, a direction shown in FIG. 2 is used for description. In this embodiment, a direction from the stationary contact mechanism 101 to the moving iron core 311 is defined as a direction from top to bottom.

With reference to FIG. 2 and FIG. 13, the direct-current contactor in this embodiment includes four contact assemblies 100. Stationary contact mechanisms C1 and C2 are defined as positive connection points, and stationary contact mechanisms D1 and D2 are defined as negative connection points. With reference to FIG. 8, when a circuit needs to be connected, a PCB supplies power to the coil 314. After the coil 314 generates a magnetic induction line, the moving iron core 311 moves upward. In this way, the moving iron core 311 drives, by using the push rod 321, the support board 322 and the conductive frame 323 to move upward, and the conductive frame 323 drives the moving contact mechanism 102 to move upward, so that the moving contact 1021 is in contact with the stationary contact 1011. Through a conduction function of the conductive frame 323, the two positive connection points C1 and C2 are conducted, and the two negative connection points D1 and D2 are conducted, thereby implementing simultaneous conduction of positive and negative electrodes in the same circuit. When a circuit needs to be disconnected, the PCB circuit board stops supplying power to the coil 314. In this case, the moving iron core 311 recovers to an initial location under a function of the reset spring 313, and further drives, by using the push rod 321, the support board 322, the conductive frame 323, and the moving contact mechanism 102 to move downward, so that the moving contact 1021 and the stationary contact 1011 are separated, thereby disconnecting the circuit.

In the direct-current contactor in this embodiment of this application, the plurality of contact assemblies 100 are disposed. For example, the four contact assemblies 100 are disposed, bipolar linkage between the positive electrode and the negative electrode may be implemented by using one drive mechanism 31, thereby reducing a volume and the manufacturing costs of the direct-current contactor, so that the direct-current contactor in this embodiment of this application has advantages of a small volume and the low manufacturing costs.

Some embodiments include a power distribution box. The power distribution box includes the direct-current contactor in the embodiments of this application. The power distribution box has all the advantages of the direct-current contactor in the embodiments of this application. Details are not described herein again.

Some embodiments include a power battery assembly. The power battery assembly includes a battery pack and the power distribution box in the embodiments of this application. For details, refer to FIG. 1. The battery pack is electrically connected to the power distribution box in the power battery assembly. The battery pack is connected to an external power supply line (for example, a charging pile) through the power distribution box.

Some embodiments include a vehicle. The vehicle includes a vehicle body and the power battery assembly disposed in the vehicle body in the embodiment of this application. Because the direct-current contactor has a feature of a small volume, occupied space in the vehicle body can be reduced.

In addition, the direct-current contactor in this embodiment of this application may be further applied on a power supply side of an electrical device in the industry, to control power-on operation of the electrical device.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A direct-current contactor, comprising:
- a contact assembly comprising a moving contact mechanism and a stationary contact mechanism that are disposed in pairs, wherein the moving contact mechanism comprises a moving contact and the stationary contact mechanism comprises a stationary contact and an arc introducing plate disposed around the stationary contact;
- an arc extinguishing assembly disposed around the contact assembly, wherein
  - the arc introducing plate is configured to introduce an electric arc generated between the moving contact mechanism and the stationary contact mechanism into the arc extinguishing assembly;
  - the arc extinguishing assembly comprises two fastening frames;
  - a plurality of arc extinguishing plates are sequentially disposed in parallel in a direction from the stationary contact to one of the fastening frames; and
  - the plurality of arc extinguishing plates are divided into two groups separately disposed in a direction from the stationary contact mechanism to the moving contact mechanism; and
- a drive assembly configured to drive a connection or a disconnection of the moving contact and the stationary contact.

2. The direct-current contactor according to claim 1, wherein the arc introducing plate comprises an arc introducing plate body and an arc introducing pin, the arc introducing pin extending from the arc introducing plate body in a direction away from the stationary contact and inserted to the arc extinguishing assembly.

3. The direct-current contactor according to claim 2, wherein the arc introducing pin gradually bends and extends from a plane on which the stationary contact is located in a direction away from the moving contact mechanism.

4. The direct-current contactor according to claim 2, wherein
- the two fastening frames are spaced and disposed opposite to each other;
- the stationary contact is located between the two fastening frames; and
- there are at least two arc introducing pins, wherein at least one arc introducing pin is inserted to one of the fastening frames, and a remaining arc introducing pin is inserted to the other fastening frame.

5. The direct-current contactor according to claim 4, wherein a free end of the arc introducing pin is located between an inner side surface of one of the fastening frames and the arc extinguishing plate close to the inner side surface of one of the fastening frames.

6. The direct-current contactor according to claim 5, wherein a reinforcing board is disposed at a location that is on the inner side surface of the fastening frame that corresponds to the arc introducing pin.

7. The direct-current contactor according to claim 4, wherein the plurality of arc extinguishing plates are sequentially disposed in parallel in thea direction from the stationary contact mechanism to the moving contact mechanism.

8. The direct-current contactor according to claim 1, wherein in a group of arc extinguishing plates disposed on a circumferential side part of the stationary contact, an end part of at least one arc extinguishing plate protrudes from a plane on which the stationary contact is located.

9. The direct-current contactor according to claim 1, wherein in the group of arc extinguishing plates disposed on a circumferential side part of the stationary contact, the plurality of arc extinguishing plates in the group are arranged in a step shape in a direction from the stationary contact to the fastening frame; and
- in a group of arc extinguishing plates disposed on a circumferential side part of the moving contact, the plurality of arc extinguishing plates in the group are arranged in a step shape in a direction from the moving contact to one of the fastening frames.

10. The direct-current contactor according to claim 1, wherein a chamfer is disposed at an edge of an end face of the moving contact mechanism for disposing the moving contact.

11. The direct-current contactor according to claim 1, wherein the drive assembly comprises:
- a drive mechanism comprising a moving iron core, a fixed iron core, a coil disposed around the fixed iron core, an accommodation cavity configured to accommodate the moving iron core and the fixed iron core, and a reset spring disposed between the moving iron core and the fixed iron core; and
- a linkage bracket comprising a push rod and a support board, wherein one end of the push rod is axially fastened to the moving iron core, the other end of the push rod is fixedly connected to the support board, a conductive frame is disposed on a side that is of the support board and that is away from the push rod, the conductive frame is connected to the moving contact mechanism, and the push rod drives, through the support board under a function of the drive mechanism, the conductive frame to move back and forth in a direction away from or close to the stationary contact mechanism.

12. The direct-current contactor according to claim 11, wherein a buffer spring is disposed between the conductive frame and the support board, a protrusion is disposed on a surface that is of the support board and that faces the conductive frame, a groove is disposed on a surface that is of the conductive frame and that faces the support board, and the buffer spring is sleeved on the protrusion and is accommodated in the groove; and
- the direct-current contactor further comprises a vertical board and a fastening board for fastening the conductive frame, the vertical board is located on two sides of the conductive frame and is fastened to the support board, the fastening board is disposed on the vertical board, and the conductive frame abuts against the fastening board.

13. The direct-current contactor according to claim 12, wherein:
- the direct-current contactor further comprises a first magnetizer and a second magnetizer that are separately disposed in a direction perpendicular to the support board;
- the first magnetizer has a U-shaped structure whose opening direction faces a side away from the support board, the first magnetizer is located between two vertical boards located on two sides of the conductive frame, and the conductive frame is fixedly connected to the first magnetizer; and
- the second magnetizer is fastened to the side away from the support board and is disposed opposite to an opening of the first magnetizer.

14. The direct-current contactor according to claim 11, wherein the direct-current contactor further comprises:

an insulation base, wherein the insulation base is disposed between the drive mechanism and the support board; and the push rod extends in a direction from the moving iron core to the contact assembly and is connected to the support board after passing through the insulation base.

15. The direct-current contactor according to claim 14, wherein the fixed iron core is located between the insulation base and the moving iron core.

16. A power distribution box, wherein the power distribution box comprises:

a contact assembly comprising a moving contact mechanism and a stationary contact mechanism that are disposed in pairs, wherein the moving contact mechanism comprises a moving contact and the stationary contact mechanism comprises a stationary contact and an arc introducing plate disposed around the stationary contact;

an arc extinguishing assembly disposed around the contact assembly, wherein the arc introducing plate is configured to introduce an electric arc generated between the moving contact mechanism and the stationary contact mechanism into the arc extinguishing assembly;

the arc extinguishing assembly comprises two fastening frames;

a plurality of arc extinguishing plates are sequentially disposed in parallel in a direction from the stationary contact to one of the fastening frames; and the plurality of arc extinguishing plates are divided into two groups separately disposed in a direction from the stationary contact mechanism to the moving contact mechanism; and a drive assembly configured to drive a connection or a disconnection of the moving contact and the stationary contact.

17. The power distribution box according to claim 16, wherein the arc introducing plate comprises an arc introducing plate body and an arc introducing pin, the arc introducing pin extending from the arc introducing plate body in a direction away from the stationary contact and inserted to the arc extinguishing assembly.

18. The power distribution box according to claim 17, wherein the arc introducing pin gradually bends and extends from a plane on which the stationary contact is located in a direction away from the moving contact mechanism.

19. A direct-current contactor, comprising:

a contact assembly comprising a moving contact mechanism and a stationary contact mechanism that are disposed in pairs, wherein the moving contact mechanism comprises a moving contact and the stationary contact mechanism comprises a stationary contact and an arc introducing plate disposed around the stationary contact;

an arc extinguishing assembly disposed around the contact assembly, wherein the arc introducing plate is configured to introduce an electric arc generated between the moving contact mechanism and the stationary contact mechanism into the arc extinguishing assembly;

the arc extinguishing assembly comprises two fastening frames;

a plurality of arc extinguishing plates are sequentially disposed in parallel in a direction from the stationary contact to one of the fastening frames;

the plurality of arc extinguishing plates are sequentially arranged in a sector shape in a direction from the stationary contact mechanism to the moving contact mechanism; and a drive assembly configured to drive a connection or a disconnection of the moving contact and the stationary contact.

* * * * *